United States Patent Office 3,632,694
Patented Jan. 4, 1972

3,632,694
PROCESS FOR THE PRODUCTION OF DIMETHYL 1 - METHYL - 2-(METHYLCARBAMOYL) VINYL PHOSPHATE
David L. Pearson, Aurora, and Bernard G. Fehringer, Peetz, Colo., assignors to Shell Oil Company, New York, N.Y.
No Drawing. Filed Dec. 26, 1968, Ser. No. 787,229
Int. Cl. A01n 9/36; C07f 9/08
U.S. Cl. 260—969     4 Claims

ABSTRACT OF THE DISCLOSURE

In the production of dimethyl 1-methyl-2-(methylcarbamoyl)vinyl phosphate by reaction of 2-chloro-N-methylacetoacetamide with trimethyl phosphite, selective conversion of trimethyl phosphite to the vinyl phosphate is increased and trimethyl phosphite consumption is decreased when a weak base is present in the reaction mixture.

BACKGROUND OF THE INVENTION

This invention comprises an improved process for the production of dimethyl 1-methyl-2-(methylcarbamoyl) vinyl phosphate, marketed commercially under the registered trademark Azodrin® Insecticide.

DESCRIPTION OF THE PRIOR ART

Conventionally dimethyl 1-methyl-2-(methylcarbamoyl)vinyl phosphate is prepared by the reaction of 2-chloro-N-methylacetoacetamide with trimethyl phosphite as described in U.S. Patent 3,258,394. This reaction is shown by the equation:

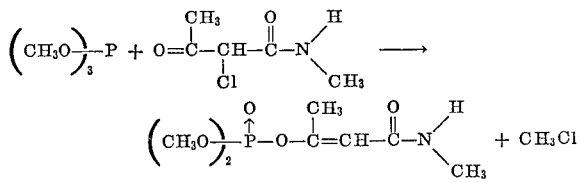

SUMMARY OF THE INVENTION

When the reaction of the phosphite with the acetoacetamide is carried out in the conventional manner, as shown in the patent, it is generally necessary to use approximately a 25–35 percent molar excess of the phosphite to effect complete reaction of the amide. Most of the phosphite is consumed during the reaction.

It has now been discovered that when the amide-phosphite reaction is carried out in the presence of a minor amount of a weak base, the quantity of phosphite consumed during the reaction is substantially reduced. This reduced consumption of phosphite represents a three-fold advantage. First, if the same molar excess of phosphite is used as without the base, the quantity of phosphite remaining in the reaction mass at the completion of the reaction is greater than that necessary to drive the reaction to completion. As a consequence, the molar excess of phosphite charged to the reaction may be reduced accordingly, thereby conferring the second advantage, which is unused reactor capacity. This unused capacity may then be used to produce more vinyl phosphate. Moreover, it is obvious that the quantity of phosphite which is not used when the molar excess of phosphite is reduced is available to be used to make more vinyl phosphate. The use of the process of the invention therefore not only decreases raw material consumption but allows increased output from the manufacturing facilities.

Thus generally this invention is an improved process for the production of dimethyl 1-methyl-2-(methylcarbamoyl)vinyl phosphate, which comprises reacting trimethyl phosphite with 2-chloro-N-methylacetoacetamide in the presence of a minor amount of a weak base.

DESCRIPTION OF THE PREFERRED EMBODIMENTS

Weak bases generally are suitable for use in the process of the invention provided they do not interfere with the amide-phosphite reaction. The $pK_a$ value of these bases may range from 0.05 or less to 12.0 or more. They may be liquid or solid and may be organic or inorganic in character.

Suitable inorganic bases are the salts of strong bases and weak acids as, for example, the alkali metal salts of acetic and carbonic acids. These include potassium carbonate, bicarbonate and acetate and sodium carbonate, bicarbonate and acetate.

Suitable organic bases are substituted and unsubstituted amides of aliphatic and aromatic acids, primary, secondary and tertiary aromatic and aliphatic amines and nitrogen-containing heterocyclic compounds.

The organic bases more readily form a solution with the reaction mass and are preferred for that reason. While solid bases such as urea will dissolve in time, liquid bases are preferred because they are readily miscible with the reaction mass and are easier to handle and measure than solids. Especially preferred are lower molecular weight bases because they are removed from the vinyl phosphate by the reduced pressure flashing through which the crude reaction mass is processed to remove lower boiling compounds.

Examples of this preferred class of bases include formamide, dimethylformamide, dimethylaniline, triethylamine and pyridine. Especially preferred because of its high degree of effectiveness in reducing the consumption of phosphite is triethylamine.

The process of this invention may be conveniently incorporated into the normal procedure for the production of the vinyl phosphate. This may be accomplished as follows. Either the amide, as a solution in a suitable organic solvent such as chloroform or methylene chloride, or the phosphite is charged to a reaction vessel equipped with a stirrer, reflux condenser, addition facilities, and a heating and cooling system. The base is then added with strring to the reactant in the reaction vessel, the contents of which are then brought to the reaction temperature. Addition of the other reactant, either the phosphite or the amide solution, is then begun. Since the amide-phosphite reaction is highly exothermic, the rate of mixing the reactants must be adjusted so as to not exceed the cooling capacity of the reaction vessel. Upon completion of the addition of the second reactant to the reaction vessel, stirring is continued at the reaction temperature until all the amide is reacted. The reaction mass is then cooled and purified during which the base is removed from the vinyl phosphate.

The temperatures at which the process of the invention may be used are concurrent with the temperatures at which the amide-phosphite reaction may be carried out. This may range as low as 20° C. or less up to the boiling point of the reaction mass which may be greater than 100° C. However, the boiling point of the base must be above the reaction temperature so that the base is not boiled out of the reaction mass or else superatmospheric pressure must be applied to prevent said loss of base.

The quantity of base needed to effectively reduce phosphite consumption, according to the process of the invention, is a minor amount of the reaction mixture. Depending upon the particular base and the quality of the amide and phosphite, this amount may range as low as one percent by weight or less to 25 percent by weight or more of the amide solution. Typically, however, the effective amount of base will be about two percent by weight of the amide solution. Determination of the effective amount of base may be readily made by those skilled in the art of organic chemistry.

Even though less phosphite is consumed when a base is present in the amide-phosphite reaction mixture, it is still necessary to have a small excess of phosphite present to insure all the amide is reacted. One skilled in the art may also determine the quantity of excess phosphite needed when a base is used. Depending upon the quality of amide and the reaction conditions, this may range as low as 5 percent molar or less up to 35 percent molar or more.

In the following examples which show the preparation of dimethyl 1-methyl-2-(methylcarbamoyl)vinyl phosphate by a semi-batch process, parts by weight (w.) bears the same relationship to parts by volume (v.) as does the kilogram to the liter.

EXAMPLE I

Preparation of dimethyl 1-methyl-2-(methylcarbamoyl)-vinyl phosphate without a phosphite stabilizer 2-chloro-N-methylacetoacetamide (87.0 parts w., 86.5% w. amide, 0.512 mole; 8.7% w. chloroform) was charged to a reaction vessel equipped with a stirrer, thermometer, reflux condenser and addition funnel. The temperature was brought to about 70° C. and trimethyl phosphite (83.1 parts w., 97.0% w. phosphite, 0.65 mole) was added with stirring and cooling in 37 minutes. The temperature was brought to about 60° C. shortly after the phosphite addition had begun and was held there for the remainder of the addition and for 2.5 hours after completion of the addition. At the end of the 2.5 hours holding period, the reaction mass was cooled to room temperature and a sample was withdrawn and analyzed for phosphite content. The remainder was stripped with a rotary evaporator to terminal conditions of 0.5 torr at 70° C. for 15 minutes. A sample of the stripped residue was then analyzed for amide by a chemical method and for vinyl phosphate by infrared spectrophotometer. The remainder of the residue was then passed through a wiped-film evaporator at 3 torr and 260° F. The bottoms from the evaporator was then analyzed for vinyl phosphate.

*Analysis.*—Unstripped Reaction Mass 3.1 parts w. trimethyl phosphite found
20.4 parts w. theoretical excess phosphite calculated on amide consumed
15.2% of theoretical excess phosphite found Stripped residue 3.3% w. residual amide
73.2% w. vinyl phosphate
82.8% molar yield based on amide charged
67.8% molar of the phosphite converted to vinyl phosphate Wiped-film evaporator bottoms 76.8% w. vinyl phosphate

EXAMPLE II

Preparation of dimethyl 1-methyl-2-(methylcarbamoyl)-vinyl phosphate using triethylamine as the phosphite stabilizer 2-chloro-N-methylacetoacetamide (87.0 parts w., 86.5% w. amide, 0.512 mole, 8.7% w. chloroform) was charged to a reaction vessel equipped as in Example I. The temperature was brought to about 80° C. and 1.7 parts w. (2% w. of the amide solution) triethylamine was added to the amide with stirring. Trimethyl phosphite (83.1 parts w., 97.0% w. phosphite, 0.65 mole) was added with stirring and cooling in 37 minutes. The temperature was brought to about 60° C. shortly after the phosphite addition had begun and was held there for 2.5 hours after completion of the addition. At the end of the 2.5 hour holding period, the reaction mass was worked up and analyzed as in Example I.

*Analysis.*—Unstripped reaction mass 11.4 parts w. trimethyl phosphite found
17.8 parts w. theoretical excess phosphite calculated on amide consumed
64.0% of theoretical excess phosphite found Stripped residue <1% w. residual amide
74.9% w. vinyl phosphate
82.6% molar yield based on amide charged
75.8% molar of phosphite converted to vinyl phosphate Wiped-film evaporator bottoms 77.4% w. vinyl phosphate Following the procedures set forth in Example II and using the same amide and phosphite feedstocks, other stabilizers were tested and the results are set forth in Table I.

TABLE I

| Stabilizer, percent w. on amide | Trimethyl phosphite | | | Moles of phosphite consumed/ mole amide consumed | Residual amide, percent w. | Purity, percent w. vinyl phosphate | Yield of vinyl phosphate, Percent m. based on amide | Selective conversion of phosphate to vinyl phosphate, percent m. | Wiped-film purity, percent w. vinyl phosphate |
|---|---|---|---|---|---|---|---|---|---|
| | Parts w. found | Parts w. theoretical excess [1] | Percent w. of theoretical found | | | | | | |
| None [2] | 5.1 | 19.8 | 25.9 | 1.25 | 2.9 | 74.0 | 80.7 | 67.8 | 77.4 |
| 2% triethylamine [3] | 11.4 | 18.1 | 63.3 | 1.11 | 1.3 | 73.6 | 80.8 | 74.1 | 76.0 |
| 5% triethylamine | 13.9 | 17.8 | 78.1 | 1.07 | 1 | 69.0 | 76.0 | 72.3 | 70.9 |
| 2% pyridine | 12.3 | 17.8 | 69.1 | 1.09 | 1 | 73.0 | 78.3 | 72.8 | 75.9 |
| 5% pyridine [4] | 12.5 | 17.7 | 70.7 | 1.08 | 1.1 | 63.2 | 70.0 | 65.4 | 65.6 |
| 2% urea | 5.5 | 17.8 | 30.9 | 1.20 | 1 | 74.2 | 83.4 | 70.5 | 75.5 |
| 5% urea [4] | 7.0 | 18.3 | 38.5 | 1.19 | 1.4 | 65.5 | 74.5 | 64.3 | 70.6 |
| 2% dimethylformamide [4] | 6.6 | 18.7 | 35.3 | 1.21 | 1.8 | 75.1 | 81.5 | 69.8 | 78.1 |
| 5% dimethylformamide | 6.8 | 20.2 | 33.7 | 1.23 | 3.2 | 73.0 | 80.7 | 69.4 | 76.9 |

[1] Calculated on amide consumed.
[2] Average of 3 tests including Example I.
[3] Average of 3 tests including Example II.
[4] Average of 2 tests.

The results presented in Table I clearly show that the best phosphite stabilizer is triethylamine used at 2% w. of the amide solution. It has the advantage of decreasing the phosphite-to-amide mole ratio almost as much as any stabilizer, while not decreasing the yield of vinyl phosphate. While pyridine at 2% decreases the phosphite-amide mole ratio more than triethylamine, it also causes a slight decrease in yield of vinyl phosphate.

While the single test above using 2% urea as the stabilizer indicated that a greater yield of vinyl phosphate might be obtained than with either triethylamine or no stabilizer, other work failed to prove this out.

It can also be seen from the above results that, in general, the 5% level of stabilizer caused some loss of yield of vinyl phosphate. Thus, the 2% level is recommended for these stabilizers.

We claim as our invention:

1. In the process for the production of dimethyl 1-methyl-2-(methylcarbamoyl)vinyl phosphate by reaction of trimethyl phosphite with 2-chloro-N-methylacetoacetamide, the improvement which comprises conducting the reaction in the presence of a base selected from the groups consisting of triethylamine, urea, pyridine and dimethylformamide.

2. The improvement of claim 1 wherein the base is triethylamine, pyridine or dimethylformamide.

3. The improvement of claim 2 wherein the base is triethylamine.

4. The improvement of claim 1 wherein the base is urea.

References Cited

UNITED STATES PATENTS 3,258,394  6/1966  Hall et al. _____ 260—943 X

CHARLES B. PARKER, Primary Examiner

A. H. SUTTO, Assistant Examiner

U.S. Cl. X.R.

260—969, 424—211